United States Patent
Lord et al.

(10) Patent No.: US 9,615,254 B2
(45) Date of Patent: Apr. 4, 2017

(54) WIRELESS POWER TRANSMITTING DEVICES, METHODS FOR SIGNALING ACCESS INFORMATION FOR A WIRELESS COMMUNICATION NETWORK AND METHOD FOR AUTHORIZING A WIRELESS POWER RECEIVING DEVICE

(71) Applicant: Intel Corporation, Santa Clara, CA (US)

(72) Inventors: Christopher J. Lord, Portland, OR (US); Mark D. Yarvis, Portland, OR (US); Ahmad Khoshnevis, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 334 days.

(21) Appl. No.: 14/221,331

(22) Filed: Mar. 21, 2014

(65) Prior Publication Data

US 2015/0271673 A1 Sep. 24, 2015

(51) Int. Cl.
*H04B 1/38* (2015.01)
*H04W 12/08* (2009.01)
(Continued)

(52) U.S. Cl.
CPC ............. *H04W 12/08* (2013.01); *H02J 5/005* (2013.01); *H02J 7/025* (2013.01); *H02J 17/00* (2013.01);
(Continued)

(58) Field of Classification Search
CPC .. H02J 7/025; H02J 5/005; H02J 17/00; H02J 2007/0096; H02J 7/0004;
(Continued)

(56) References Cited

U.S. PATENT DOCUMENTS 7,626,967 B2 12/2009 Yarvis et al.
7,923,971 B2 4/2011 Kojima
(Continued)

FOREIGN PATENT DOCUMENTS

JP 2007329983 A 12/2007
JP 2009022122 A 1/2009
(Continued)

OTHER PUBLICATIONS

Rezence, "Alliance for Wireless Power", Technical Specification, Rezence Wireless Charging Standard, A4WP, retrieved on Mar. 31, 2014, 3 pages, available at: http://www.rezence.com/technology/technical-specification.
(Continued)

*Primary Examiner* — Olumide T Ajibade Akonai
(74) *Attorney, Agent, or Firm* — Viering, Jentschura & Partner mbB

(57) ABSTRACT

A wireless power transmitting device is described comprising a power transmitter to wirelessly transmit power to a wireless power receiving device, a controller configured to control the wireless power transfer to the wireless power receiving device via a wireless power transfer control channel of a first wireless communication network between the wireless power transmitting device and the wireless power receiving device and a signaling circuit configured to signal access information for a second wireless communication network via the wireless power transfer control channel.

19 Claims, 12 Drawing Sheets

(51) Int. Cl.
*H02J 5/00* (2016.01)
*H02J 7/02* (2016.01)
*H02J 17/00* (2006.01)
*H04W 4/00* (2009.01)
*H04W 12/06* (2009.01)
*H02J 50/10* (2016.01)
*H04B 5/00* (2006.01)
*H04W 84/12* (2009.01)

(52) U.S. Cl.
CPC ............ *H02J 50/10* (2016.02); *H04B 5/0037* (2013.01); *H04W 4/008* (2013.01); *H04W 12/06* (2013.01); *H04B 5/0081* (2013.01); *H04W 84/12* (2013.01)

(58) Field of Classification Search
CPC .... H02J 2007/0001; H02J 7/042; H02J 7/045; H02J 2007/005; H02J 7/0027; B60L 11/182; B60L 11/185; B60L 11/1861; H04B 5/0037; H04B 5/0075; H04B 7/26; Y02T 90/122; Y02T 10/7088; H04W 4/008; H04W 12/06; H04W 88/02; H04W 84/12
USPC ........ 307/104; 320/108, 107, 114; 340/10.1; 455/39, 41.1–41.3, 522, 573, 270, 274
See application file for complete search history.

(56) References Cited

U.S. PATENT DOCUMENTS

| | | | | |
|---|---|---|---|---|
| 8,363,609 B2* | 1/2013 | Zhang | ................. | H04W 76/023 370/329 |
| 8,410,637 B2 | 4/2013 | Karaoguz et al. | | |
| 9,054,746 B2 | 6/2015 | Miyabayashi et al. | | |
| 9,094,059 B2* | 7/2015 | Lee | ..................... | H04B 5/0031 |
| 9,166,654 B2* | 10/2015 | Lee | ..................... | H04B 5/0037 |
| 2009/0015210 A1 | 1/2009 | Kojima | | |
| 2009/0108679 A1* | 4/2009 | Porwal | ................... | H02J 17/00 307/104 |
| 2009/0322285 A1* | 12/2009 | Hautanen | .............. | H01Q 1/243 320/137 |
| 2011/0127843 A1* | 6/2011 | Karaoguz | .......... | G06K 7/10207 307/104 |
| 2012/0098634 A1* | 4/2012 | Takaishi | ............... | H04B 5/0081 336/200 |
| 2012/0212072 A1 | 8/2012 | Miyabayashi et al. | | |
| 2012/0248891 A1 | 10/2012 | Drennen | | |
| 2013/0026981 A1* | 1/2013 | Van Der Lee | .......... | H02J 5/005 320/108 |
| 2014/0008990 A1* | 1/2014 | Yoon | ....................... | H02J 5/005 307/104 |
| 2014/0035379 A1* | 2/2014 | Stevens | ................. | H02J 7/0013 307/104 |
| 2014/0035526 A1 | 2/2014 | Tripathi et al. | | |
| 2015/0031334 A1* | 1/2015 | Wu | ......................... | H02J 5/005 455/411 |
| 2015/0097447 A1 | 4/2015 | Washiro | | |
| 2015/0171930 A1* | 6/2015 | Joehren | ................ | H04B 5/0037 455/41.1 |

FOREIGN PATENT DOCUMENTS

| | | |
|---|---|---|
| JP | 2012175797 A | 9/2012 |
| JP | 2013505179 A | 2/2013 |
| JP | 2015050719 A | 3/2015 |
| JP | 2015076993 A | 4/2015 |
| WO | 2011035329 A2 | 3/2011 |

OTHER PUBLICATIONS

PMA "Power Matters Alliance" retrieved on Mar. 31, 2014, 1 page, available at: http://www.powermatters.org/about/about-2.

"An introduction to wireless charging: changing the way we think about power", Wireless Power Consortium, retrieved on Mar. 31, 2014, 2 pages, available at: http://www.wirelesspowerconsortium.com/what-we-do/how-it-works/.

Nieminen et al. "Transmission of IPv6 Packets over Bluetooth Low Energy", Internet Draft, draft-ietf-6lowpan-btle-12, Feb. 12, 2013, 14 pages.

Office Action received for Taiwanese Patent Application No. 104104754, dated Dec. 25, 2015, 10 pages of Office Action and 11 pages of English Translation.

Office Action received for JP Patent Application 2015026003, dated Mar. 29, 2016, 4 pages of Office Action and 5 pages of English translation.

\* cited by examiner

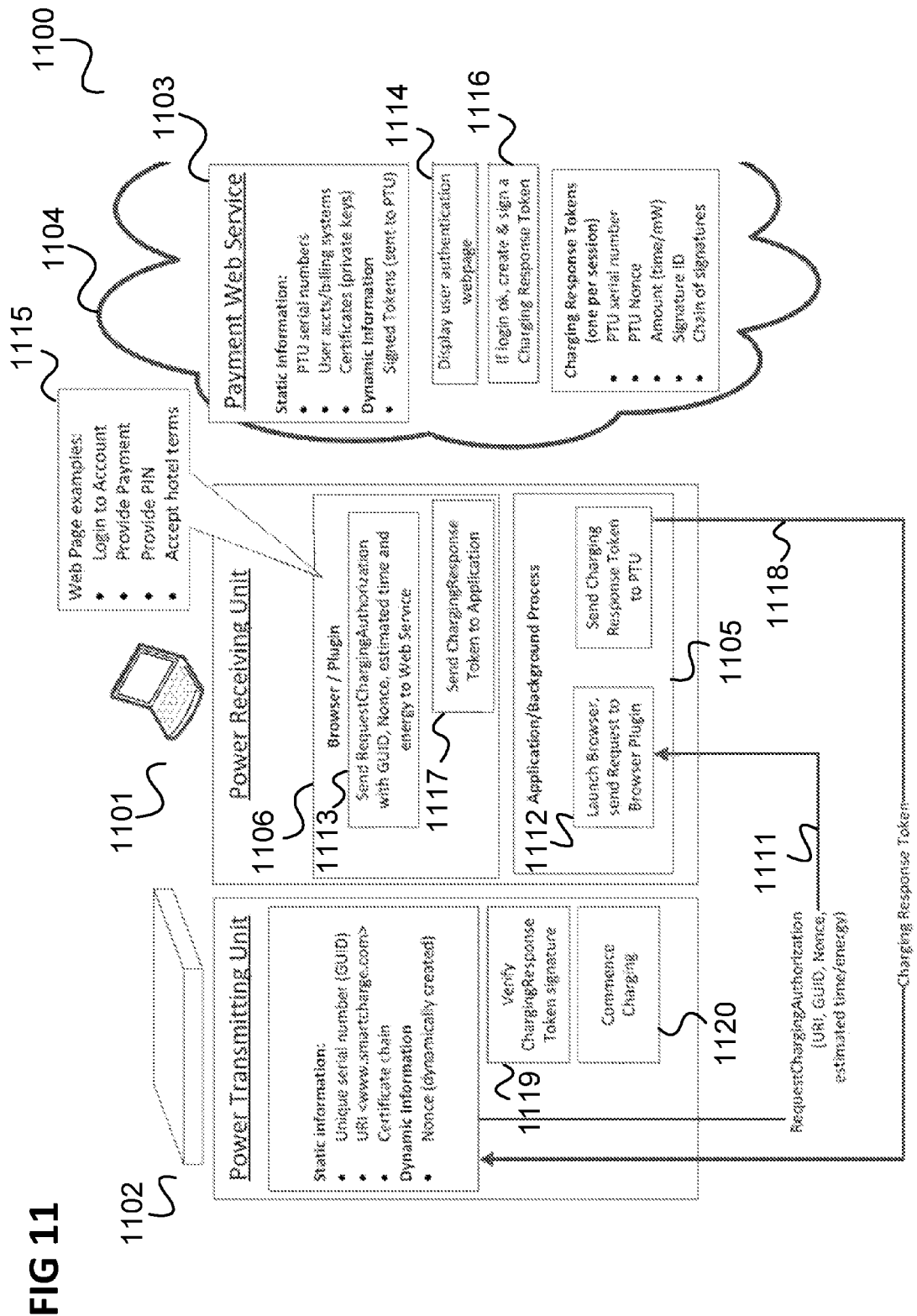

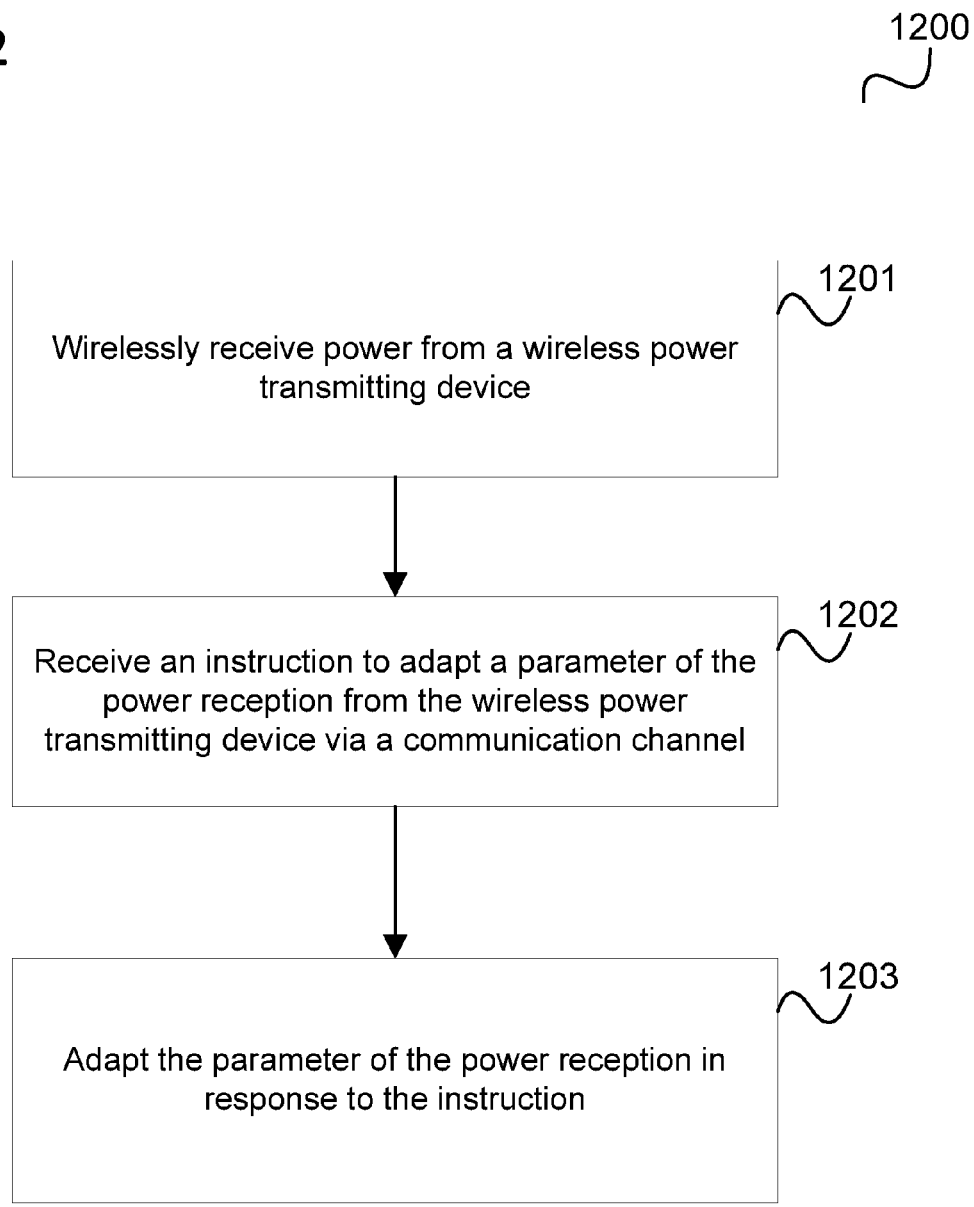

WIRELESS POWER TRANSMITTING DEVICES, METHODS FOR SIGNALING ACCESS INFORMATION FOR A WIRELESS COMMUNICATION NETWORK AND METHOD FOR AUTHORIZING A WIRELESS POWER RECEIVING DEVICE

TECHNICAL FIELD

Embodiments described herein generally relate to wireless power transmitting devices, methods for signaling access information for a wireless communication network and method for authorizing a wireless power receiving device.

BACKGROUND

With the wide usage of electronic mobile devices and the need to regularly charge these devices, convenient opportunities to charge mobile devices are searched for. Wireless charging may allow a user to charge a mobile device without the need to bring his recharger. It can be expected that wireless power transfer stations will be more widely deployed in the future and may for example be used by restaurants, hotels etc. to offer customers the opportunity to charge and/or power-on their mobile devices. Accordingly, mechanisms and features of wireless power transmitting devices that make them more effective and convenient for their users and their operators are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 11 shows a communication arrangement illustrating the usage of token for wireless power transfer authentication according to one example.

FIG. 12 shows a flow diagram illustrating the operation at the receiving side of a method for authorizing a wireless power receiving device for receiving and utilizing the wireless power.

DESCRIPTION OF EMBODIMENTS

Figure 1:
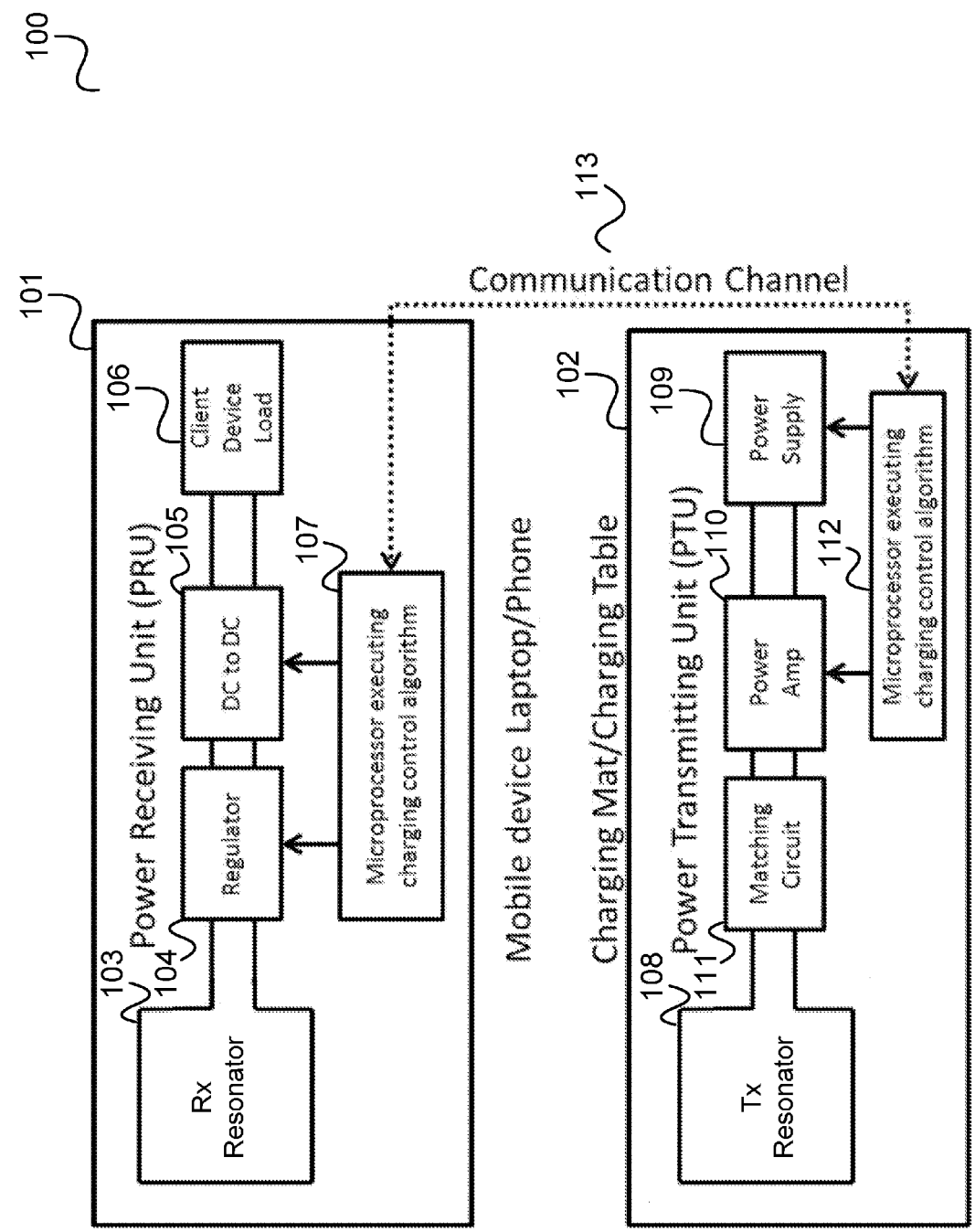
FIG. 1 shows a wireless power transfer arrangement.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Commercial establishments, such as coffee shops, bookstores and airports typically offer WiFi hotspots as a convenience. In order to recoup network costs and prevent non-customers from accessing or abusing the WiFi network such hotspots typically utilize network access control which requires the user to acquire certain access information such as shared credentials. The access information (e.g. keying material) is typically refreshed daily by the respective network operator and thus is a burden for the network operator to administer and manage. Therefore, some establishments have abandoned sharing daily credentials (e.g. a username and a password) with their customers. However, many hotels continue to employ a daily/multi-day credential access scheme, i.e. an access control scheme which requires users to acquire credentials for network access which are changed daily or once every couple of days by the operator.

Furthermore, wireless power transfer is becoming more ubiquitous. PC laptops, smartphones, even backpacks are or can be expected to soon be shipping with wireless power transfer facilities. The power transferred by a wireless power transfer system can be used for operating devices without the need for power cord, or can be used for charging battery in battery operating devices. A system, consisting of a power transmitter and a power receiver and/or a control mechanism, in which the wireless power is used for charging batteries is referred to as wireless charging system. Standardization in the field of wireless power transfer is for example performed by the Alliance for Wireless Power (A4WP), the Power Matters Alliance and the Wireless Power Consortium. For example, smartphones already exist which include a wireless charging mechanism compatible with the wireless power specification by the Wireless Power Consortium and restaurant chains start providing wireless charging according to the specification by the Power Matters Alliance and the specification by the Wireless Power Consortium, respectively.

According to the wireless power transfer specifications above, a digital communication channel is established between the mobile device (typically a mobile communication device such as a communication terminal) to receive the power and the power transmitter (i.e. the wireless power transmitter, e.g. in the form of a table or mat that might be referred to as charging table or charging mat) specifies and controls parameters before and during wireless power transfer via the communication channel. According to the Wireless Power Consortium a backscatter modulation scheme is used for the communication via the digital communication channel in which the receiver (i.e. the mobile device that is charged) amplitude modulates the power signal sent by the power transmitter to provide a communications channel. According to the A4WP, Bluetooth Low Energy (BLE) is used for the communication channel between the power transmitter, also referred to as power transmitting unit (PTU), and the mobile device, generally referred to as power receiving unit (PRU). The architecture according to A4WP is described in the following as an example for a wireless power transfer arrangement.

FIG. 1 shows a wireless power transfer arrangement 100.

The wireless power transfer arrangement 100 includes a power receiving unit (PRU) 101, e.g. a mobile device such as a laptop or a mobile phone, and a power transmitting unit (PTU) 102, e.g. a charging mat or a charging table.

The PRU 101 includes a reception resonator 103 for receiving power which it provides via a regulator 104 and a DC-DC-converter 105 to a client device load 106, e.g. a battery that is to be charged. A PRU microprocessor may 107 control the regulator 104 and the DC-DC-converter 105 in accordance with a charging control algorithm.

The PTU 102 includes a transmission resonator 108 for sending power which it receives from a power supply 109 via a power amplifier 110 and a matching circuit 111. A PTU microprocessor 112 controls the power supply 109 and the power amplifier 110 in accordance with the charging control algorithm.

The PRU microprocessor 107 and the PTU microprocessor 112 communicate via a communication channel 113. In this example, the PRU 101 and the PTU 102 operate the communication channel 113 according to BLE at 2.4 GHz. The power transmission from the transmission resonator 108 to the reception resonator 103 is for example performed at 6.78 MHz.

In the following examples, the architecture as illustrated in FIG. 1 is used as an exemplary architecture. However, all examples may also be used with other architectures, including the architectures according to the Power Matters Consortium and the Wireless Power Consortium as well as any other wireless charging architecture.

In the following, examples are given which can be seen to provide at least one of
1. An automatic distribution of access credentials (such as WLAN credentials, e.g. including username and password) via a wireless power transfer (or transmitting) station or a wireless charging station (i.e. the power transmitter, e.g. the PTU) and
2. An automatic authorization for use by a wireless power transfer station or a wireless charging station (or facility, also referred to as wireless power transmitting device in the following) by usage of a network protocol which includes the mobile device getting a token from a trusted resource. For example, a mobile device needs to be authorized prior to enabling full wireless charging by the wireless charging station, i.e. the power transmitter. Thus, receiving wireless power and/or charging (or at least full charging) may be restricted to authorized users (e.g. paying customers). A use case is for example that the owner of a hotel or another establishment wishes to monetize the wireless charging facilities per user, or on a metered basis.

Figure 2:
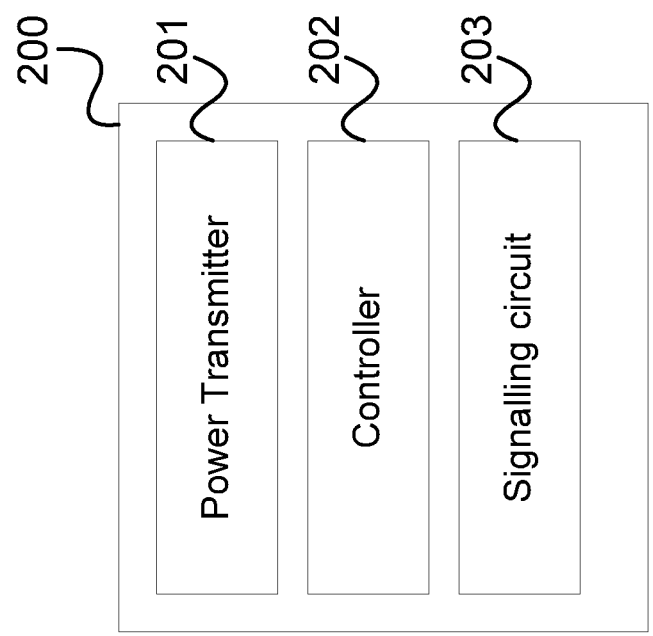
FIG. 2 shows a wireless power transmitting device which may for example provide access information to a wireless power receiving device receiving the wireless power, e.g., being charged.

FIG. 2 shows a wireless power transmitting device 200 which may for example provide access information (e.g. WLAN access credentials) to a wireless power receiving device receiving the wireless power.

The wireless power transmitting device 200 includes a power transmitter 201 to wirelessly transmit power to a wireless power receiving device (e.g. for charging or power-on of a mobile device) and a controller 202 configured to control the power transmitted to the wireless power receiving device via a wireless power transfer control channel (may refer to as control channel, or wireless power control channel) of a first wireless communication network between the wireless power transmitting device and the wireless power receiving device.

The wireless power transmitting device 200 further includes a signaling circuit 203 configured to signal access information for a second wireless communication network via the wireless power transfer control channel.

In other words, access information for a communication network (other than the wireless network used for transmitting the wireless power or the control information) is transmitted via the communication channel which is used for transmitting the wireless power control information. For example, in the exemplary architecture of FIG. 1, the PTU uses the communication channel 113 for transmission of access information for a wireless communication network which may for example be a WLAN (i.e. WiFi) network but which also may be a wide area cellular communication network such as according to UMTS, LTE, etc.

Figure 3:
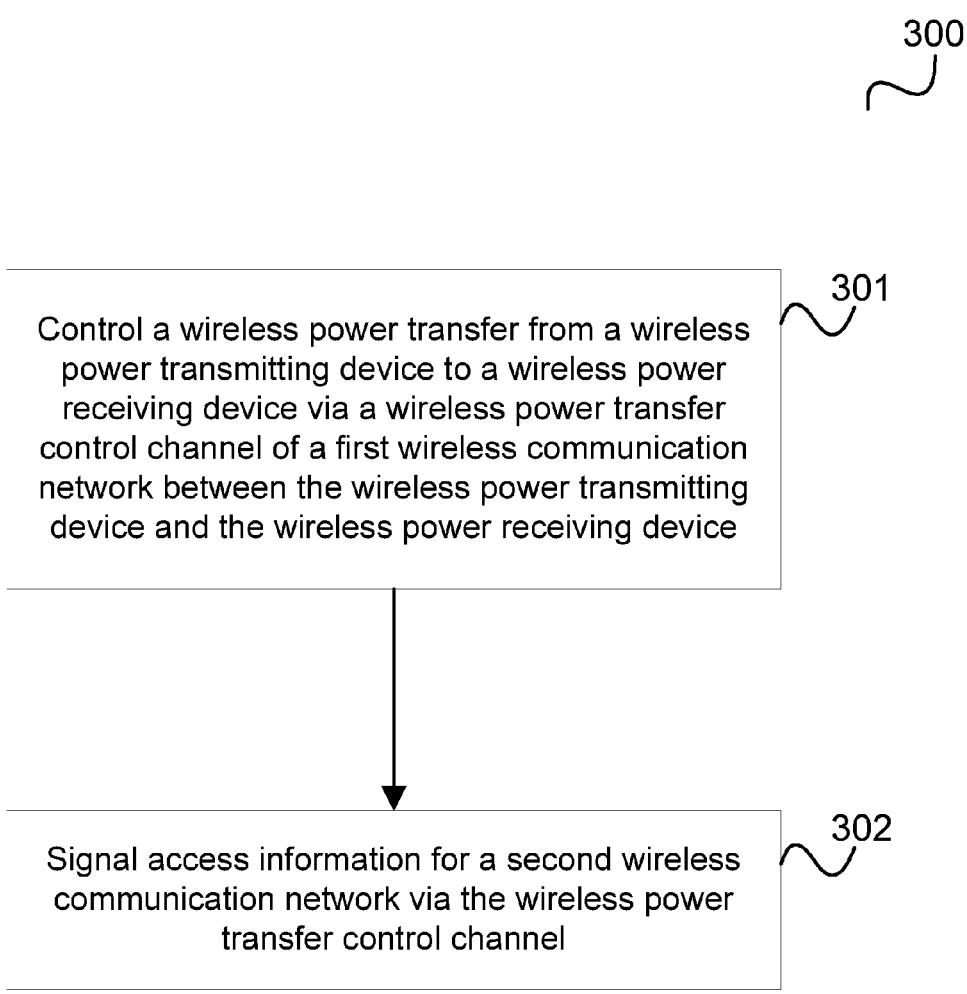
FIG. 3 shows a flow diagram illustrating a method for signaling access information for a wireless communication network.

The wireless power transmitting device 200 for example carries out a method as illustrated in FIG. 3.

FIG. 3 shows a flow diagram 300 illustrating a method for signaling access information for a wireless communication network, for example carried out by a wireless power transmitting device.

In 301, the wireless power transmitting device controls a wireless power transfer from the wireless power transmitting device to a wireless power receiving device via a wireless power transfer control channel of a first wireless communication network between the wireless power transmitting device and the wireless power receiving device.

In 302, the wireless power transmitting device signals access information for a second wireless communication network via the wireless power transfer control channel.

Figure 4:
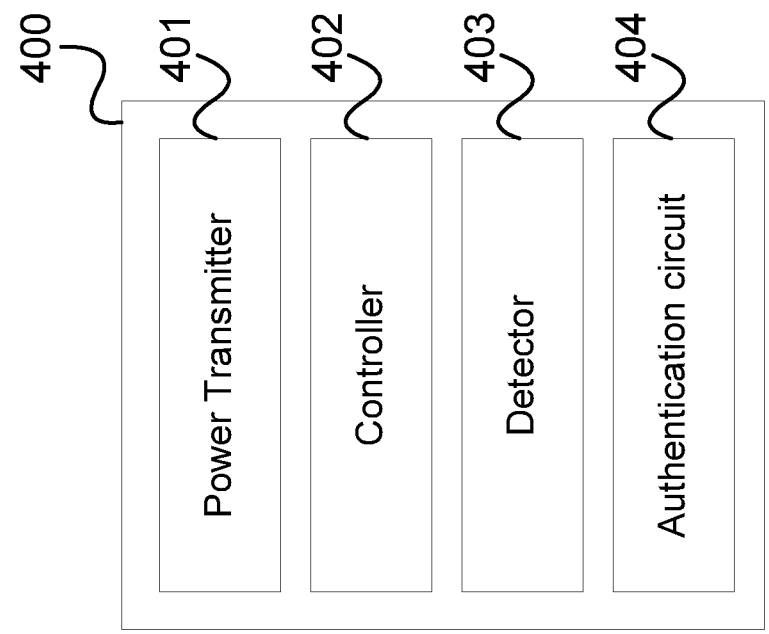
FIG. 4 shows a wireless power transmitting device including a mechanism for authorization of a wireless power receiving device to receive and utilize the wireless power.

FIG. 4 shows a wireless power transmitting device 400 including a mechanism for authorization of receiving wireless power that can be used for charging and/or power-on of a mobile device.

The wireless power transmitting device 400 includes a power transmitter 401 to wirelessly transmit power to a wireless power receiving device (e.g. for charging and/or power-on of a mobile device) and a controller 402 configured to instruct the wireless power receiving device to adapt a parameter of the power reception from the power transmitter via a communication channel between the wireless power transmitting device and the wireless power receiving device.

The wireless power transmitting device 400 further includes a detector 403 configured to detect whether the wireless power receiving device interrupts power reception for the predetermined time and an authentication circuit 404 configured to verify that the wireless power receiving device to which the power transmitter transmits power is the same as the wireless power receiving device connected to the wireless power transmitting device by the communication channel based on whether the wireless power receiving device adapts the parameter of the power reception.

In other words, a wireless power transmitting device checks whether a wireless power receiving device (e.g. a mobile device to be charged, e.g. placed on a charging mat or on a charging table) is the right device (i.e. a device authorized for charging and/or receiving wireless power), namely the one connected to the wireless power transmitting device by a communication channel which the wireless power transmitting device for example uses for controlling the wireless power transfer (e.g. charging), by instructing the mobile device to adapt power reception, e.g. to pause power reception, via the communication channel and checking whether the device changes the power reception in accordance with the instruction.

Figure 5:
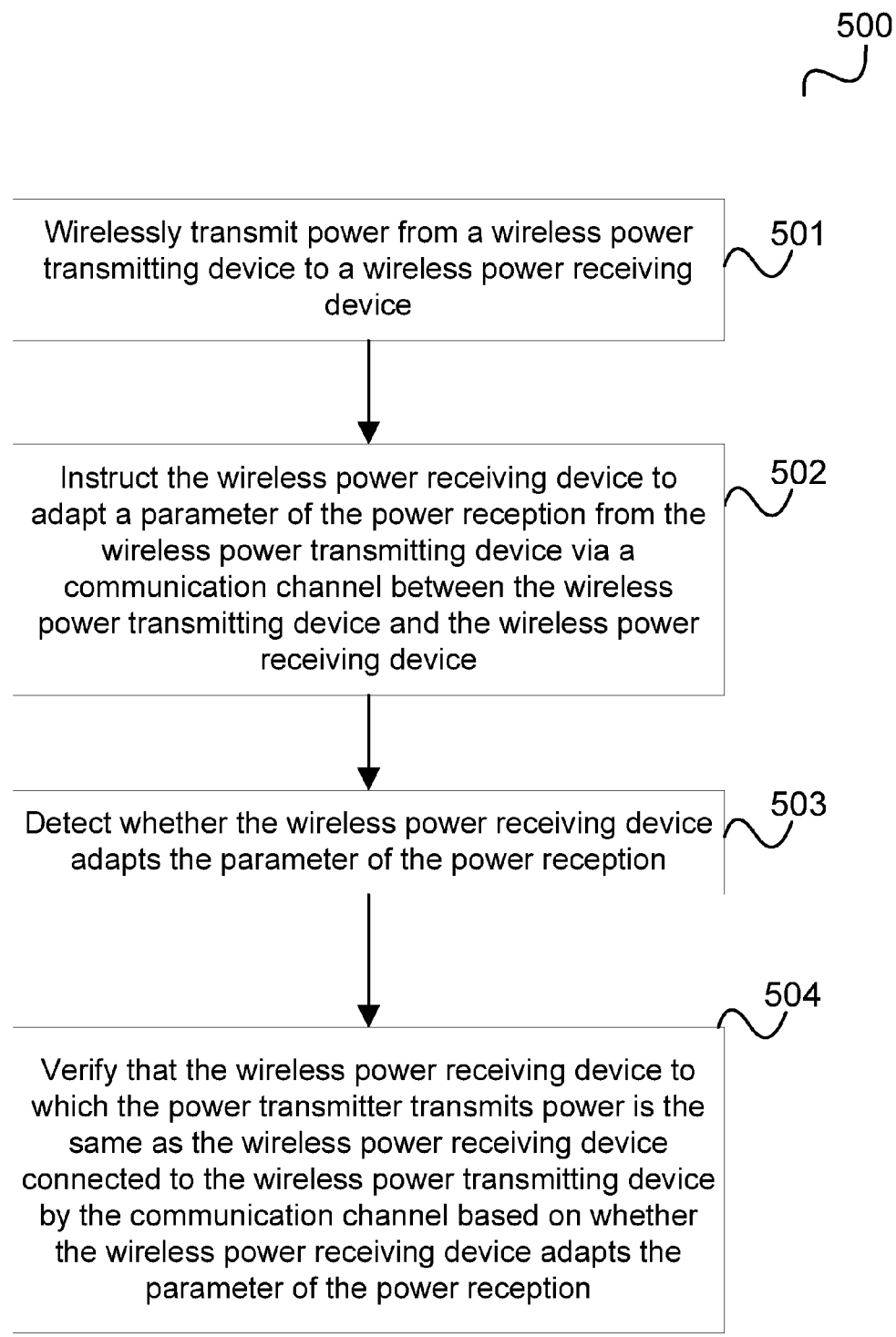
FIG. 5 shows a flow diagram illustrating a method for authorizing a wireless power receiving device for receiving and utilizing the wireless power.

The wireless power transmitting device 400 for example carries out a method as illustrated in FIG. 5.

FIG. 5 shows a flow diagram 500 illustrating a method for authorizing a mobile device for receiving wireless power and/or charging, for example carried out by a wireless power transmitting device.

In 501, the wireless power transmitting device wirelessly transmits power from a wireless power transmitting device to a wireless power receiving device.

In 502, the wireless power transmitting device instructs the wireless power receiving device to adapt a parameter of the power reception from the wireless power transmitting device via a communication channel between the wireless power transmitting device and the wireless power receiving device.

In 503, the wireless power transmitting device detects whether the wireless power receiving device adapts the parameter of the power reception.

In 504, the wireless power transmitting device verifies that the wireless power receiving device to which the power transmitter transmits power is the same as the wireless power receiving device connected to the wireless power transmitting device by the communication channel based on whether the wireless power receiving device adapts the parameter of the power reception.

Figure 6:
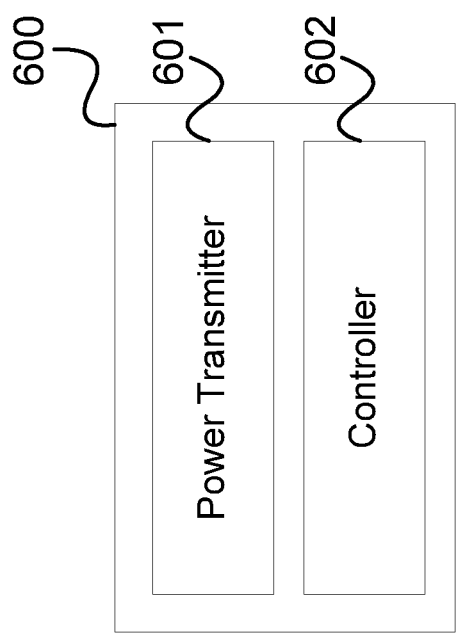
FIG. 6 shows a wireless power transmitting device including another mechanism for authorization of a wireless power receiving device for receiving and utilizing the wireless power.

FIG. 6 shows a wireless power transmitting device 600 including another mechanism for authorization of a wireless power receiving device to receive wireless power and/or to be charged (which may be used in addition or independently to the authorization mechanism described above with reference to FIG. 4).

The wireless power transmitting device 600 includes a power transmitter 601 to wirelessly transmit power to a wireless power receiving device (e.g. for charging a mobile device).

The wireless power transmitting device 600 further includes a controller 602 configured to request the wireless power receiving device to provide an electronic token indicating that the wireless power receiving device has the right to receive power from the power transmitter, to verify, based on the reception of a valid token from the wireless power receiving device, whether the wireless power receiving device has the right to receive power from the power transmitter and to control the power transmitter to transmit power to the wireless power receiving device based on whether the wireless power receiving device has the right to receive power from the power transmitter.

In other words, a wireless power transmitting device requires a (e.g. mobile) device to be charged (or which wishes or requests to be charged or receive wireless power) to provide a token proving that the device has the right to be charged or receive wireless power by the wireless power transmitting device. The device may for example acquire the token from a trusted entity, e.g. via the Internet.

Figure 7:
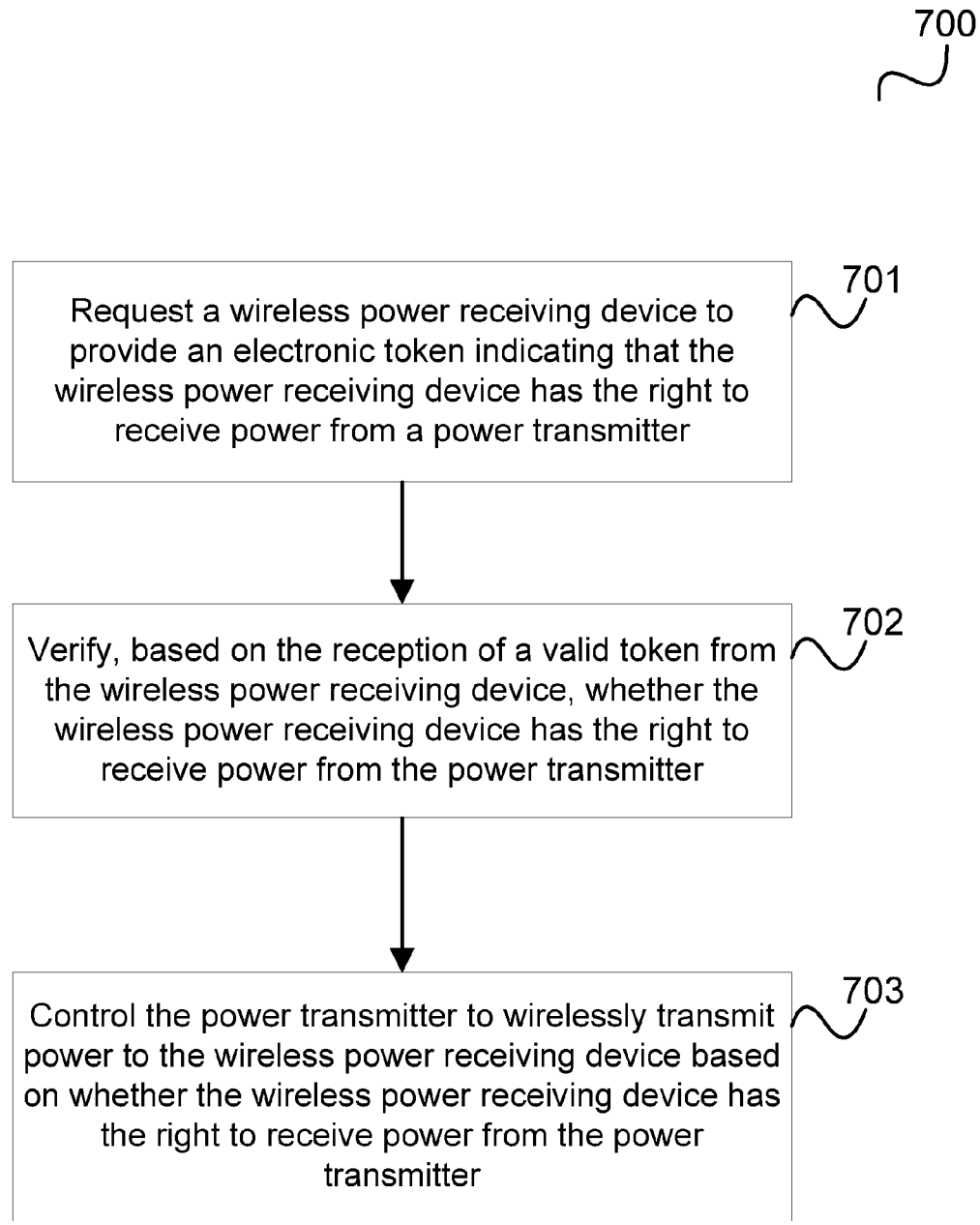
FIG. 7 shows a flow diagram illustrating a method for authorizing a wireless power receiving device for receiving and utilizing the wireless power.

The wireless power transmitting device 600 for example carries out a method as illustrated in FIG. 7.

FIG. 7 shows a flow diagram 700 illustrating a method for authorizing a mobile device, e.g. for charging and/or receiving wireless power, for example carried out by a wireless power transmitting device.

In 701, the wireless power transmitting device requests a wireless power receiving device to provide an electronic token indicating that the wireless power receiving device has the right to receive power from a power transmitter.

In 702, the wireless power transmitting device verifies, based on the reception of a valid token from the wireless power receiving device, whether the wireless power receiving device has the right to receive power from the power transmitter.

In 703, the wireless power transmitting device controls the power transmitter to wirelessly transmit power to the wireless power receiving device based on whether the wireless power receiving device has the right to receive power from the power transmitter.

It should be noted that further, devices according to the wireless power transmitting devices and methods described above may be provided.

For example, according to the wireless power transmitting device 200, a device is provided including a power receiver configured to wirelessly receive power from a wireless power transmitting device for charging the device and a first receiver configured to receive control information for the charging of the device via a control channel (may also referred to as wireless power transfer control channel, or charging control channel) of a first wireless communication network between the wireless power transmitting device and the device.

The device further includes a second receiver configured to receive access information for a second wireless communication network via the charging control channel.

Further, according to the wireless power transmitting device 400, a device is provided including a power receiver configured to wirelessly receive power from a wireless power transmitting device (e.g. for charging and/or power-on of the mobile device), a receiver configured to receive an instruction to adapt a parameter of the power reception from the wireless power transmitting device via a communication channel between the wireless power transmitting device and the device and a controller configured to adapt the parameter of the power reception in response to the instruction.

Further, according to the wireless power transmitting device 600, a device is provided including a power receiver configured to wirelessly receive power from a wireless power transmitting device (e.g. for charging the device), a receiver configured to receive a request to provide an electronic token indicating that the device has the right to receive power from the wireless power transmitting device and a transmitter configured to provide an electronic token indicating that the device has the right to receive power from the wireless power transmitting device to the wireless power transmitting device.

The following examples pertain to further embodiments.

Example 1 is a wireless power transmitting device as described with reference to FIG. 2.

In Example 2, the subject matter of Example 1 can optionally include the first wireless communication network being different from the second wireless communication network.

In Example 3, the subject matter of any one of Examples 1-2 can optionally include the first wireless communication network and the second wireless communication network using different radio access technologies.

In Example 4, the subject matter of any one of Examples 1-3 can optionally include the wireless power transmitting device comprising an authentication circuit configured to authenticate the wireless power receiving device and the signaling circuit being configured to signal the access information based on whether the authentication circuit has authenticated the wireless power receiving device.

In Example 5, the subject matter of any one of Examples 1-4 can optionally include the wireless power transmitting device comprising an authentication circuit configured to authenticate the wireless power receiving device and the power transmitter being configured to wirelessly transmit power to the wireless power receiving device based on whether the authentication circuit has authenticated the wireless power receiving device.

In Example 6, the subject matter of Example 5 can optionally include the authentication circuit being configured to authenticate the wireless power receiving device by verifying that the wireless power receiving device to which the power transmitter transmits power is the same as the wireless power receiving device connected to the wireless power transmitting device by the wireless power transfer control channel.

In Example 7, the subject matter of any one of Examples 1-6 can optionally include the power transmitter being configured to wirelessly transmit power to the wireless power receiving device using a power signal and the wireless power transfer control channel being a channel based on a modulation of the power signal.

In Example 8, the subject matter of any one of Examples 1-7 can optionally include the wireless power transfer control channel operating in a different radio frequency band than the frequency band used by the power transmitter to transmit power.

In Example 9, the subject matter of any one of Examples 1-8 can optionally include the first wireless communication network being a Bluetooth communication network and the wireless power transfer control channel being a Bluetooth channel.

In Example 10, the subject matter of any one of Examples 1-9 can optionally include the second wireless communication network being a wireless local area network or a cellular mobile telephone communication network.

In Example 11, the subject matter of any one of Examples 1-10 can optionally include the access information including credentials for the wireless communication network.

In Example 12, the subject matter of any one of Examples 1-11 can optionally include the wireless power transmitting device comprising a receiver configured to receive the access information from a further communication device.

In Example 13, the subject matter of any one of Examples 1-12 can optionally include the further communication device being an Internet server.

Example 14 is a method for signaling access information as described with reference to FIG. 3.

In Example 15, the subject matter of Example 14 can optionally include the first wireless communication network being different from the second wireless communication network.

In Example 16, the subject matter of any one of Examples 14-15 can optionally include the first wireless communication network and the second wireless communication network using different radio access technologies.

In Example 17, the subject matter of any one of Examples 14-16 can optionally include authenticating the wireless power receiving device and signaling the access information based on a successful authentication of the wireless power receiving device.

In Example 18, the subject matter of any one of Examples 14-17 can optionally include authenticating the wireless power receiving device and wirelessly transmitting power to the wireless power receiving device based on a successful authentication of the wireless power receiving device.

In Example 19, the subject matter of Example 18 can optionally include authenticating the wireless power receiving device by verifying that the wireless power receiving device to which the power transmitter transmits power is the same as the wireless power receiving device connected to the wireless power transmitting device by the wireless power transfer control channel.

In Example 20, the subject matter of any one of Examples 14-19 can optionally include wirelessly transmitting power to the wireless power receiving device using a power signal, wherein the wireless power transfer control channel is a channel based on a modulation of the power signal.

In Example 21, the subject matter of any one of Examples 14-20 can optionally include the wireless power transfer control channel operating in a different radio frequency band than the frequency band used by the power transmitter to transmit power.

In Example 22, the subject matter of any one of Examples 14-21 can optionally include the first wireless communication network being a Bluetooth communication network and the wireless power transfer control channel being a Bluetooth channel.

In Example 23, the subject matter of any one of Examples 14-22 can optionally include the second wireless communication network being a wireless local area network or a cellular mobile telephone communication network.

In Example 24, the subject matter of any one of Examples 14-23 can optionally include the access information including credentials for the wireless communication network.

In Example 25, the subject matter of any one of Examples 14-24 can optionally include receiving the access information from a further communication device.

In Example 26, the subject matter of any one of Examples 14-25 can optionally include the further communication device being an Internet server.

Example 27, is a computer readable medium having recorded instructions thereon which, when executed by a processor, make the processor perform a method for performing radio communication according to any one of Examples 14 to 26.

Example 28 is a wireless power transmitting device comprising a power transmitting means for wirelessly transmitting power to a wireless power receiving device; a controlling means for controlling the wireless power transfer to the wireless power receiving device via a wireless power transfer control channel of a first wireless communication network between the wireless power transmitting device and the wireless power receiving device; and a signaling means for signaling access information for a second wireless communication network via the wireless power transfer control channel.

In Example 29, the subject matter of Example 28 can optionally include the first wireless communication network being different from the second wireless communication network.

In Example 30, the subject matter of any one of Examples 28-29 can optionally include the first wireless communication network and the second wireless communication network using different radio access technologies.

In Example 31, the subject matter of any one of Examples 28-30 can optionally include the wireless power transmitting device comprising an authentication means for authenticating the wireless power receiving device and the signaling means being for signaling the access information based on whether the authentication circuit has authenticated the wireless power receiving device.

In Example 32, the subject matter of any one of Examples 28-31 can optionally include the wireless power transmitting device comprising an authentication means for authenticating the wireless power receiving device and the power transmitting means being for wirelessly transmitting power to the wireless power receiving device based on whether the authentication circuit has authenticated the wireless power receiving device.

In Example 33, the subject matter of Examples 32 can optionally include the authentication means being for authenticating the wireless power receiving device by verifying that the wireless power receiving device to which the power transmitting transmits power is the same as the wireless power receiving device connected to the wireless power transmitting device by the wireless power transfer control channel.

In Example 34, the subject matter of any one of Examples 28-33 can optionally include the power transmitting means being for wirelessly transmitting power to the wireless power receiving device using a power signal and the wireless power transfer control channel being a channel based on a modulation of the power signal.

In Example 35, the subject matter of any one of Examples 28-34 can optionally include the wireless power transfer control channel operating in a different radio frequency band than the frequency band used by the power transmitter to transmit power.

In Example 36, the subject matter of any one of Examples 28-35 can optionally include the first wireless communication network being a Bluetooth communication network and the wireless power transfer control channel being a Bluetooth channel.

In Example 37, the subject matter of any one of Examples 28-36 can optionally include the second wireless communication network being a wireless local area network or a cellular mobile telephone communication network.

In Example 38, the subject matter of any one of Examples 28-37 can optionally include the access information including credentials for the wireless communication network.

In Example 39, the subject matter of any one of Examples 28-38 can optionally include the wireless power transmitting device comprising a receiving means for receiving the access information from a further communication device.

In Example 40, the subject matter of any one of Examples 28-39 can optionally include the further communication device being an Internet server.

Example 41 is a wireless power transmitting device as described with reference to FIG. 4.

In Example 42, the subject matter of Examples 41 can optionally include the controller being configured to instruct the wireless power receiving device to interrupt the power reception from the power transmitter.

In Example 43, the subject matter of any one of Examples 41-42 can optionally include the controller being configured to instruct the wireless power receiving device to adapt the parameter of the power reception for a predetermined time and the authentication circuit being configured to verify that the wireless power receiving device to which the power transmitter transmits power is the same as the wireless power receiving device connected to the wireless power transmitting device by the communication channel based on whether the wireless power receiving device adapts the parameter of the power reception for the predetermined time.

In Example 44, the subject matter of Examples 43 can optionally include the controller being configured to randomly determine the predetermined time.

In Example 45, the subject matter of any one of Examples 41-44 can optionally further include a signaling circuit configured to signal access information for a wireless communication network to the wireless power receiving device based on whether the wireless power receiving device to which the power transmitter transmits power is the same as the wireless power receiving device connected to the wireless power transmitting device by the communication channel.

In Example 46, the subject matter of Example 45 can optionally include the wireless communication network being a wireless local area network or a cellular mobile telephone communication network.

In Example 47, the subject matter of any one of Examples 45-46 can optionally include the access information including credentials for the wireless communication network.

In Example 48, the subject matter of any one of Examples 45-47 can optionally include the wireless power transfer control channel being a channel of a further wireless communication network different from the wireless communication network.

Example 49 is a method for signaling access information as described with reference to FIG. 5.

In Example 50, the subject matter of Examples 49 can optionally include instructing the wireless power receiving device to interrupt the power reception from the power transmitter.

In Example 51, the subject matter of any one of Examples 49-50 can optionally include instructing the wireless power receiving device to adapt the parameter of the power reception for a predetermined time and verifying that the wireless power receiving device to which the power transmitter transmits power is the same as the wireless power receiving device connected to the wireless power transmitting device by the communication channel based on whether the wireless power receiving device adapts the parameter of the power reception for the predetermined time.

In Example 52, the subject matter of Examples 51 can optionally include randomly determining the predetermined time.

In Example 53, the subject matter of any one of Examples 49-52 can optionally include signaling access information for a wireless communication network to the wireless power receiving device based on whether the wireless power receiving device to which the power transmitter transmits power is the same as the wireless power receiving device connected to the wireless power transmitting device by the communication channel.

In Example 54, the subject matter of any one of Examples 53—can optionally include the wireless communication network being a wireless local area network or a cellular mobile telephone communication network.

In Example 55, the subject matter of any one of Examples 53-54 can optionally include the access information including credentials for the wireless communication network.

In Example 56, the subject matter of any one of Examples 53-55 can optionally include the wireless power transfer control channel being a channel of a further wireless communication network different from the wireless communication network.

Example 57 is a computer readable medium having recorded instructions thereon which, when executed by a processor, make the processor perform a method for performing radio communication according to any one of Examples 49 to 55.

Example 58 is a wireless power transmitting device comprising a power transmitting means for wirelessly transmitting power to a wireless power receiving device; a controlling means for instructing the wireless power receiving device to adapt a parameter of the power reception from the power transmitting means via a communication channel between the wireless power transmitting device and the wireless power receiving device; a detecting means for detecting whether the wireless power receiving device adapts the parameter of the power reception; an authentication means for verifying that the wireless power receiving device to which the power transmitting transmits power is the same as the wireless power receiving device connected to the wireless power transmitting device by the communication channel based on whether the wireless power receiving device adapts the parameter of the power reception.

In Example 59, the subject matter of Examples 58 can optionally include the controlling means being for instructing the wireless power receiving device to interrupt the power reception from the power transmitter.

In Example 60, the subject matter of any one of Examples 58-59 can optionally include the controlling means being for instructing the wireless power receiving device to adapt the parameter of the power reception for a predetermined time and the authentication means being for verifying that the wireless power receiving device to which the power transmitter transmits power is the same as the wireless power receiving device connected to the wireless power transmitting device by the communication channel based on whether the wireless power receiving device adapts the parameter of the power reception for the predetermined time.

In Example 61, the subject matter of one of Examples 60 can optionally include the controlling means being for randomly determining the predetermined time.

In Example 62, the subject matter of Example 61 can optionally further include a signaling means for signaling access information for a wireless communication network to the wireless power receiving device based on whether the wireless power receiving device to which the power transmitter transmits power is the same as the wireless power receiving device connected to the wireless power transmitting device by the communication channel.

In Example 63, the subject matter of Example 62 can optionally include the wireless communication network being a wireless local area network or a cellular mobile telephone communication network.

In Example 64, the subject matter of any one of Examples 62-63 can optionally include the access information including credentials for the wireless communication network.

In Example 65, the subject matter of any one of Examples 62-64 can optionally include the wireless power transfer control channel being a channel of a further wireless communication network different from the wireless communication network.

Example 66 is a wireless power transmitting device as described with reference to FIG. 6.

In Example 67, the subject matter of Examples 66 can optionally include the controller being configured to determine whether a token received from the wireless power receiving device is valid.

In Example 68, the subject matter of Example 67 can optionally include the controller being configured to determine whether a token received from the wireless power receiving device is valid based on a signature of the electronic token.

In Example 69, the subject matter of any one of Examples 66-68 can optionally include the controller being configured to request the wireless power receiving device to provide an electronic token indicating that the wireless power receiving device has the right to be fully charged by the power transmitter, to verify, based on the reception of a valid token from the wireless power receiving device, whether the wireless power receiving device has the right to be fully charged by the power transmitter and to control the power transmitter to fully charge the wireless power receiving device based on whether the wireless power receiving device has the right to be fully charged by the power transmitter.

In Example 70, the subject matter of any one of Examples 66-69 can optionally include the controller being configured to request the wireless power receiving device to provide the electronic token by transmitting a request message to the wireless power receiving device indicating that the wireless power receiving device is to provide the electronic token.

In Example 71, the subject matter of Example 70 can optionally include the message including at least one of the address of a communication device providing the electronic token, a serial number of the wireless power transmitting device, a URI of a web service providing the electronic token and a nonce.

In Example 72, the subject matter of Example 71 can optionally include the communication device being an Internet server.

In Example 73, the subject matter of Example 72 can optionally include the communication device being a web server.

In Example 74, the subject matter of any one of Examples 66-73 can optionally include the controller being configured to determine an amount of charge from the electronic token which the wireless power receiving device has the right to receive and to control the power transmitter to transmit the amount of charge to the wireless power receiving device.

Example 75 is a method for authorizing a wireless power receiving device as described with reference to FIG. 7.

In Example 76, the subject matter of Example 75 can optionally include determining whether a token received from the wireless power receiving device is valid.

In Example 77, the subject matter of Example 76 can optionally include determining whether a token received from the wireless power receiving device is valid based on a signature of the electronic token.

In Example 78, the subject matter of any one of Examples 75-77 can optionally include requesting the wireless power receiving device to provide an electronic token indicating that the wireless power receiving device has the right to be fully charged by the power transmitter, verifying, based on the reception of a valid token from the wireless power receiving device, whether the wireless power receiving device has the right to be fully charged by the power transmitter and controlling the power transmitter to fully charge the wireless power receiving device based on whether the wireless power receiving device has the right to be fully charged by the power transmitter.

In Example 79, the subject matter of any one of Examples 75-78 can optionally include requesting the wireless power receiving device to provide the electronic token by transmitting a request message to the wireless power receiving device indicating that the wireless power receiving device is to provide the electronic token.

In Example 80, the subject matter of Example 80 can optionally include the message including at least one of the address of a communication device providing the electronic token, a serial number of the wireless power transmitting device, a URI of a web service providing the electronic token and a nonce.

In Example 81, the subject matter of Example 80 can optionally include the communication device being an Internet server.

In Example 82, the subject matter of Examples 81 can optionally include the communication device being a web server.

In Example 83, the subject matter of any one of Examples 75-82 can optionally include determining an amount of charge from the electronic token which the wireless power receiving device has the right to receive and controlling the power transmitter to transmit the amount of charge to the wireless power receiving device.

Example 84 is a computer readable medium having recorded instructions thereon which, when executed by a processor, make the processor perform a method for performing radio communication according to any one of Examples 75-83.

Example 85 is a wireless power transmitting device comprising a power transmitting means for wirelessly transmitting power to a wireless power receiving device; a controlling means for requesting the wireless power receiving device to provide an electronic token indicating that the wireless power receiving device has the right to receive power from the power transmitter, verifying, based on the reception of a valid token from the wireless power receiving device, whether the wireless power receiving device has the right to receive power from the power transmitting means and controlling the power transmitting means to transmit power to the wireless power receiving device based on whether the wireless power receiving device has the right to receive power from the power transmitting means.

In Example 86, the subject matter of Example 85 can optionally include the controlling means is for determining whether a token received from the wireless power receiving device is valid.

In Example 87, the subject matter of Example 86 can optionally include the controlling means is for determining whether a token received from the wireless power receiving device is valid based on a signature of the electronic token.

In Example 88, the subject matter of any one of Examples 85-87 can optionally include the controlling means being for requesting the wireless power receiving device to provide an electronic token indicating that the wireless power receiving device has the right to be fully charged by the power transmitting means, for verifying, based on the reception of a valid token from the wireless power receiving device, whether the wireless power receiving device has the right to be fully charged by the power transmitting means and for controlling the power transmitter to fully charge the wireless power receiving device based on whether the wireless power receiving device has the right to be fully charged by the power transmitting means.

In Example 89, the subject matter of any one of Examples 85-88 can optionally include the controlling means is for requesting the wireless power receiving device to provide the electronic token by transmitting a request message to the wireless power receiving device indicating that the wireless power receiving device is to provide the electronic token.

In Example 90, the subject matter of Example 89 can optionally include the message including at least one of the address of a communication device providing the electronic token, a serial number of the wireless power transmitting device, a URI of a web service providing the electronic token and a nonce.

In Example 91, the subject matter of Example 90—can optionally include the communication device being an Internet server.

In Example 92, the subject matter of Example 91 can optionally include the communication device being a web server.

In Example 93, the subject matter of any one of Examples 85-92 can optionally include the controlling means being for determining an amount of charge from the electronic token which the wireless power receiving device has the right to receive and control the power transmitting means to transmit the amount of charge to the wireless power receiving device.

It should be noted that one or more of the features of any of the examples above may be combined with any one of the other examples.

In the following, examples are described in more detail. As mentioned above, in the following examples the architecture illustrated in FIG. 1 is used as a basis but any other wireless charging architecture may be used alternatively.

In the following examples, a wireless power transmitting device uses a communication between the wireless power transmitter (i.e. the wireless power transmitting device) and the wireless power receiver (e.g. a mobile device to be charged) to provision credentials to the mobile (receiver) device for a Wi-Fi access.

For example, the wireless power transmitting device (i.e. the PTU 102) initially transfers a small amount of power (i.e. a power beacon) to the PRU 101 to power-up the PRU 101, setup the communication channel 113, and identify and establish operating parameters before power is transferred to complete a full charge of the battery of the PRU 101. During this process, the PTU 101 may use the communication channel 113 to securely deliver WiFi credentials. This may for example eliminate the need to manually distribute WLAN credentials to legitimate customers. Namely, instead charging stations push the credentials, e.g. charging tables and charging mats to the customers' mobile devices. Mobile devices that are known to be physically present in a location, e.g. a store or restaurant, since they have been charged or receiving wireless power in the location, can now (e.g. automatically) connect to a WiFi network provided in the location. The wireless power transmitting devices may or may not be directly connected to the local WLAN network. However, they are in any case provided with a mechanism to store and update the WLAN credentials.

Further, in the following examples, a wireless power transmitting device (e.g. a wireless charging transmitter) uses a network protocol to authenticate a wireless power receiver device before allowing full rate power transfer or before completing a full or partial charge of the receiver, e.g. the receiver's battery.

For example, if the owner of a commercial establishment (e.g. a restaurant, airport or hotel) wants to be paid for use of wireless power transfer stations (and the consumed electricity) or wants to simply restrict access to paying customers then he/she may require the wireless power transmitting devices (e.g. charging mats) to authorize mobile devices before charging them or transferring wireless power to them. For example, a wireless power transmitting device uses a mechanism to authenticate and authorize devices via a cloud based protocol and cloud service as described below. The need to securely deliver WLAN credentials to the wireless power transmitting device may be a prerequisite to access the cloud service for authentication/authorization for payment of a charging session.

An exemplary use case is the access to a hotel's WLAN and payment for wireless power transfer services that are provided in the hotel. This is illustrated in FIG. 8.

Figure 8:
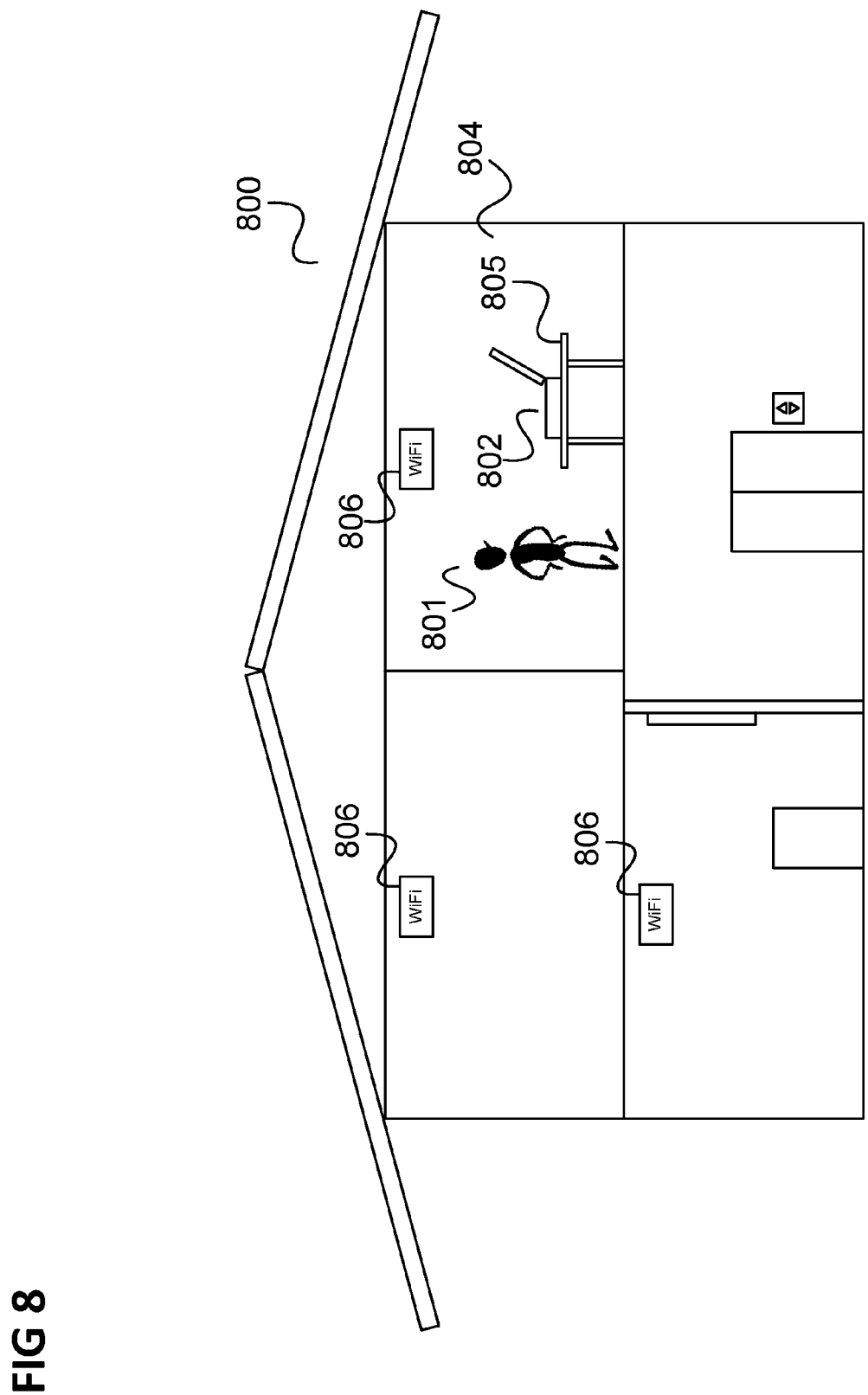
FIG. 8 shows a hotel which provides wireless power services and a WLAN network.

FIG. 8 shows a hotel 800 which provides wireless power transfer services and a WLAN network.

For example, a hotel customer 801 arrives with a mobile device 802 that supports wireless power transfer, checks-in and picks up his room key or key fob. The customer 801 walks into his room 804 and lays his mobile device (e.g. a laptop with wireless power reception capability or a mobile phone, e.g. corresponding to PRU 101) 802 on a charging desk 805 (e.g. corresponding to PTU 102). The desk 805 and the mobile device 802 exchange power transfer information and exchange Wi-Fi credentials via a communication channel (e.g. corresponding to communication channel 113). The mobile device 802 can now access the hotel's WiFi network provided by access points 806 without the customer 801 having to manually enter the credentials.

In this use case, the credentials traverse from the hotel's WiFi network through the wireless power transfer station 805 over the wireless power transfer communication channel and to the mobile device 802. The mobile device 802 then uses it to gain access to the wireless (WiFi) network.

Owners of commercial establishments may prefer to be financially compensated (i.e. to charge customers) for using wireless power transfer facilities. In the example of FIG. 8, to achieve this, the hotel's wireless power transfer station 805 may check for authorization from a trusted network service before it starts charging and/or receiving wireless power. The customer (user) 801 may for example be required to go to a third-party web site and enter a credit card number or proof of purchase, in exchange for a certain amount of charge and/or wireless power (the amount can be measured by the amount of energy, amount of power, or the duration of receiving wireless power).

Alternatively, the customer 801 may be required to browse to the hotel's web site and acknowledge that wireless power transfer fees will be added to his room charges. Once the user has accepted the agreement the wireless power transmitting device 805 commences wireless power transfer (or continues full charging and/or full rate power transfer) of the mobile device 802.

As explained above with reference to FIG. 1, according to A4WP, a communication channel based on Bluetooth Low Energy (BLE) is used as communications channel 113 between the Power Receiving Unit 101 and the Power Transmitting Unit 102. The BLE architecture classifies devices into Clients and Servers, where Servers expose Services and Attributes and Clients use those Attributes. Attributes are simply logical state variables on the Server with permissions and security requirements that can be read and/or potentially written by the Client. Servers can notify Clients when the logical value changes. Attributes have UUIDs (universally unique identifiers) that are either standardized by the Bluetooth SIG (special interest group) or created by the device manufacturer to customize and extend functionality. According to A4WP the PTU 102 is the Client and the PRU 101 is the Server.

Figure 9:
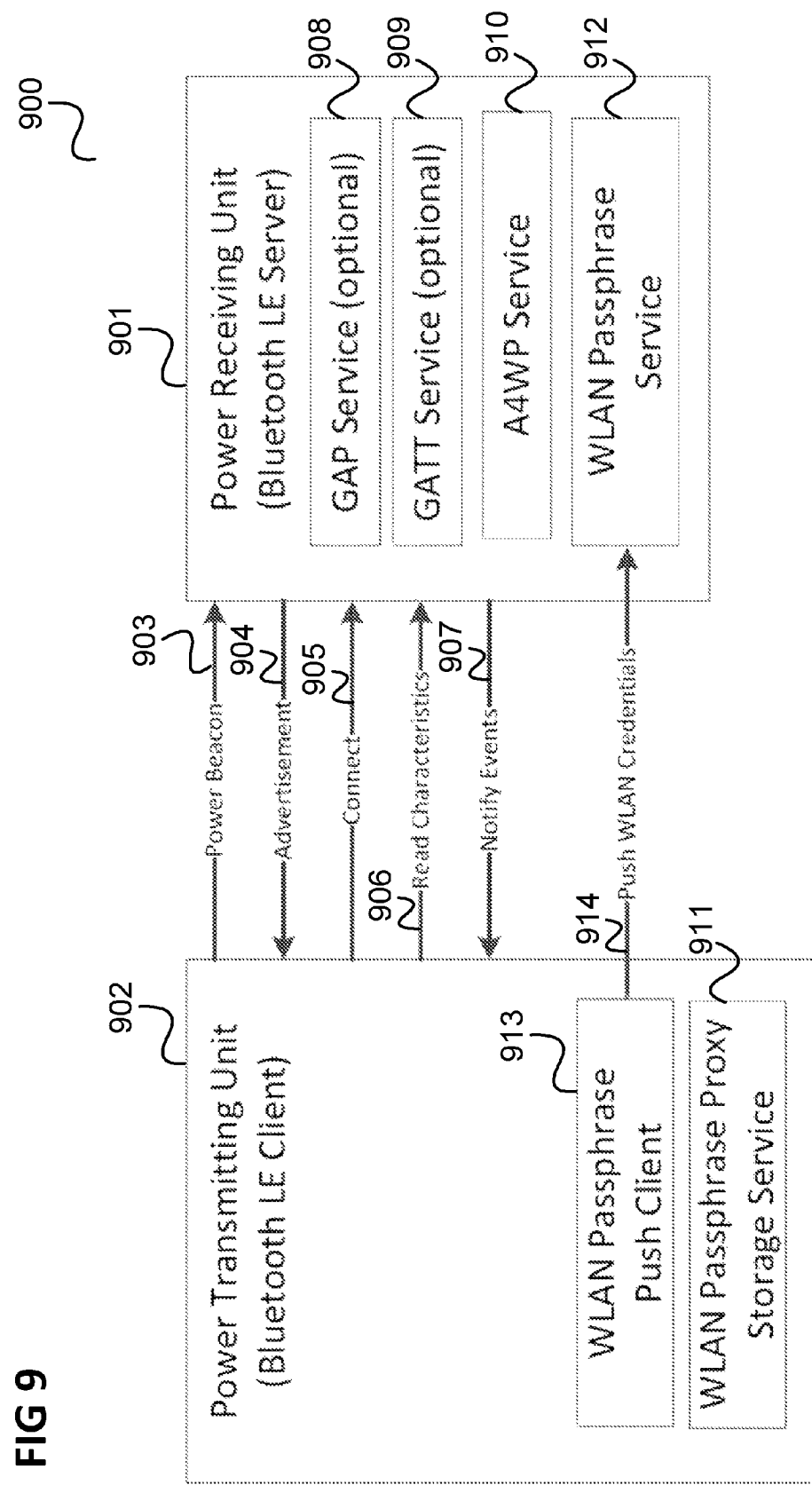
FIG. 9 shows a wireless power transfer arrangement.

An example for a communication between the PRU 101 and the PTU 102 is illustrated in FIG. 9.

FIG. 9 shows a wireless charging arrangement 900.

The wireless power transfer arrangement 900 includes a power receiving unit 901 corresponding to PRU 101 and a power transmitting unit 902 corresponding to PTU 102.

In 903, the PTU 902 sends power pulses.

The PRU 101 only advertises itself in 904 over BLE (i.e. via the communication channel 113) after detecting the power pulse over its Rx Resonator 103 from the PTU 902.

In 905, after receiving the PRU's advertisement the PTU 902 connects to the PRU 901 and in 906 the PTU 902 requests to read the PRU's static and dynamic attributes. In 907, PRU 901 issues notifications to the PTU 902 such as about overcurrent, overvoltage or overtemperature.

The PRU 901 for example has the ability to provide a list of all primary services such as GAP (Generic Access Profile) Service 908, GATT (Generic Attribute Profile) Service 909 and the A4WP charging service 910.

In this example, the PRU 901 and the PTU 902 further support the ability to push WiFi credentials from the PTU 902 to the PRU 901. For this, in this example, two additional BLE device services, a storage service 911 on the PTU 902 to manage and store WLAN pass-phrases (in other words WiFi credentials) and a WLAN pass-phrase service 912 on the PRU 901 to receive the WLAN pass-phrases from a WLAN pass-phrase push client 913 of the PTU 902 after it connects during a power charging session.

The PTU 902 acts as a BLE Client (Credential Push) in that when it discovers the WLAN pass-phrase service 912 in the PRU 901 the PTU 902 in 914 writes the current WLAN credentials to the appropriate attribute and thus pushes the WLAN credentials to the PRU 901.

The PRU 901 can then in turn push the WLAN credentials to its the device's WLAN stack, i.e. provided by its operating system's native WiFi software and connect to the, for example, hotel's WLAN, according to IEEE 802.11.

While this is described in context of A4WP, a similar approach may be used in the context of other wireless power standards.

A mechanism may be provided to avoid man in the middle attacks between the PTU 902 and the PRU 901 when exchanging WLAN credentials. For example, Wireless Power Transfer may support authentication and/or encryption of the communication channel for controlling the power transfer, e.g. communication channel 113.

According to A4PW, the PTU 902 accepts PRU BLE connections without authentication and without encryption. However if bonding has occurred in the past (authentication and encryption) then the PTU 902 and the PRU 901 reconnect securely. In the case of an unsecure connection, the WLAN credentials are transferred in the open over the communication channel 113. If this poses a security issue the PTU 902 may be configured to not send the WLAN credentials until the user (e.g. customer 801) pairs the PRU 901 and the PTU 901 via a PIN or password. However, even on an authenticated and/or encrypted link, the PTU 902 may need to ensure that the mobile device which is going to be charged, e.g. which is placed on the wireless power transmitting device (e.g. charging mat) for charging, is the same as the mobile device connected to the PTU 902 via the communication channel 113 rather than a rogue device.

Therefore, in this example, before the PTU 102 pushes the WLAN credentials to the PRU 101, the PTU 102 requests the PRU 101 to suspend charging for a random number of milliseconds (e.g. 100 to 2000). If the PRU 101 complies, this can be detected by the PTU 102 and provides confirmation to the PTU 102 that the device getting the WLAN credential is the device that is actually connected to the PTU 101 for charging.

The PTU 102 may have the ability to store the WLAN credentials locally (i.e. in a memory of the wireless power transmitting device) and/or receive and forward them from another communication device, e.g. a proxy to provide the storage service 911 (e.g. a "WLAN Proxy Storage Service" BLE service).

For example, an employee of the hotel 800 uses a mobile phone containing the daily credentials and walks to wireless power transfer station 805 (also referred to as charging station) of the hotel, pairs the mobile phone and the wireless power transfer station 805 and stores the credentials in the charging station 805. In this case, for example, the PTU 102 (corresponding to the charging station 805) acts as a BLE Server, it advertises the storage service 911, connects to the mobile phone (which is acting as a BLE Client), and allows the mobile phone to update the Attributes containing the credentials. BLE Security can be employed here to only allow pre-paired or authenticated devices (such as the mobile phone) to update the Attributes of the Storage Service.

Figure 10:
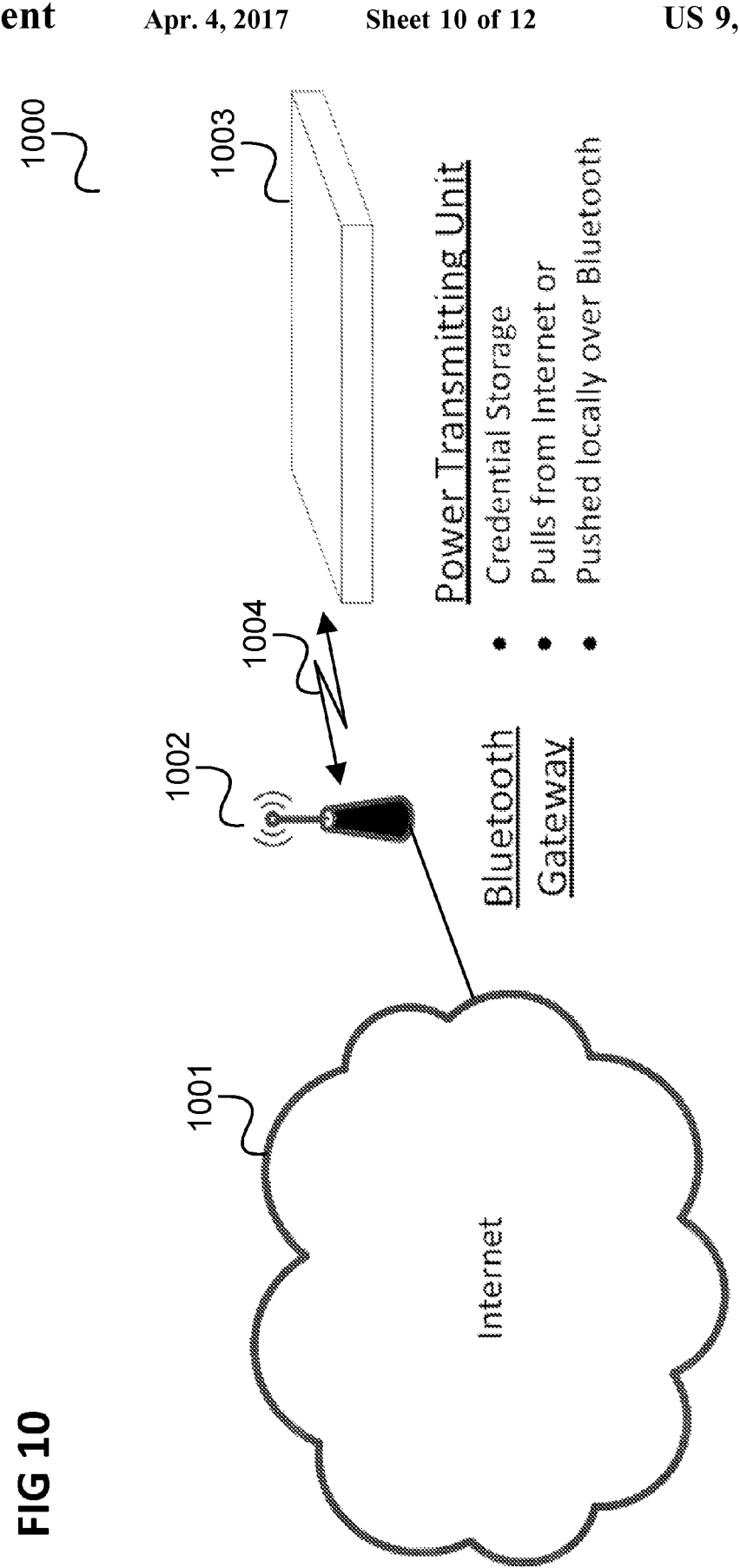
FIG. 10 shows a communication arrangement for the provision of WLAN credentials to the PTU.

Another example for the provision of the PTU's credential storage service is illustrated in FIG. 10.

FIG. 10 shows a communication arrangement 1000 for the provision of WLAN credentials to the PTU.

The communication arrangement 1000 includes the Internet 1001, a Bluetooth Gateway 1002 (i.e. a Bluetooth enable gateway) and a power transmitting unit 1003 for example corresponding to the PTU 102.

The PTU 1003 provides a credential storage service (corresponding to storage service 911) that is connected to the Internet, e.g. to a cloud service. For example, the PTU 1003 can connect by means of a Bluetooth connection 1004 to the Bluetooth gateway 1002 and onto the Internet, e.g. over IPv6. The PTU 1003 may additionally be configured with an HTTP/RESTful stack and use one or more cloud services to populate the WLAN credentials.

The PTU 1003 may retrieve or receive WLAN credentials either over the Internet, e.g. by pulling them from the Internet. Alternatively, as described above, the PTU 1003 may receive the WLAN credentials via a local provisioning step, e.g. from another communication device (e.g. a mobile phone as in the example above) which pushes the credentials onto the PTU 1003 locally, e.g. using Bluetooth.

The wireless power transfer arrangement 100 may further provide the ability to control access to the charging unit, i.e. to PTU 102, in other words to control whether a mobile device is charged. For example, it supports metering access to the PTU 102, i.e. to the charging service, and thus addresses the business need of authenticating a user's PRU 101 (e.g. the mobile device 802 of customer 801) and billing that user for the wireless charging service.

For this, the PTU 102 for example only enables wireless power transfer and/or charging after it has received an electronic (digital) token from a trusted third party, for instance, a trusted cloud-based service.

This is illustrated in FIG. 11.

FIG. 11 shows a communication arrangement 1100 illustrating the usage of token for wireless power transfer and/or charging authentication according to one example.

The communication arrangement 1100 includes a power receiving unit 1101 for example corresponding to PRU 101, a power transmitting unit 1102 for example corresponding to PTU 102 and a web service 1103 provided by a web server located in the Internet 1104.

The PTU 1102 contains a Universal Resource Identifier (URI) pointing to the web service, its unique serial number (GUID) and a certificate chain to validate responses from the web service (i.e. from the web server providing the web service). The PRU 1101 for example contains an application (or background process) 1105 to connect with a web browser 1106, e.g. via browser plug-in, installed on the PRU 1101. The browser 1106 may display web pages for interaction with the user of the PRU 1101 and communicate with the web service. The web server contains user accounts, PTU information and implements the payment system.

For the following example, it is assumed that the PTU 1102 and the PRU 1101 have established a communication channel (e.g. corresponding to communication channel 113) and have set up and/or negotiated power parameters, i.e. parameters for the wireless power transfer and/or charging such as charging power, charging frequency etc. The PRU 1101 for example estimates the amount of charging time or electrical charge needed to complete a full charge. The PRU 1101 is also assumed to have Internet access, e.g. based on a WLAN and the WLAN credentials received from the PTU 1102 as described in the above examples.

In the following, an example for a process flow for charging authentication by means of a token is given.

In 1111, the PTU 1102 transmits a token request in the form of a RequestChargingAuthorization message with the URI, GUID, and a randomly generated Nonce to the PRU 1101.

In 1112, the PRU application 1105 either launches the PRU's web browser 1106 or connects directly to Web Service 1103 (per the URI).

In 1113, the PRU application 1105 or the web browser 1106, as the case may be, sends the RequestChargingAuthorization with GUID, Nonce and estimated time and energy to fully charge the PRU's battery to the Web Service 1103.

In 1114, the Web Service 1103 requests user authentication.

In 1115, the PRU 1101 requests the user for an authentication via the web browser 1106 or via the application 1105. The user logs into an existing user account (e.g. using web browser 1106), provide a payment (e.g., via a credit card), provide a PIN (e.g., a code given to him during the hotel check in, for example) or accept other billing terms (e.g. accept that the cost will be billed to his room). The user may also have the opportunity to select the amount of charging he wishes to pay for (e.g., as a percentage of total battery charge).

In 1116, if the user authentication is validated, the Web Server generates a token denoted as ChargingResponseToken, in this example including information for the PTU 1102, signs it for integrity protection and returns it to the PRU 1101. The information in the token includes a token identifier, the PTU serial number, the amount of charge authorized, the nonce generated in the token request, the signature, and a certificate chain allowing signature verification.

In 1117, if the application 1105 has contacted the web service 1103 via the web browser 1106, the web browser 1106 sends the token to the application 1105.

In 1118, the application 1105 sends the token to the PTU 1102.

In 1119, the PTU 1102 checks whether the signature of the token is valid and signed by a designated signature chain and that the nonce matches the one sent in the token request.

In 1120, if the signature is valid the PTU 1102 commences wireless power transfer and/or charging or continues for the amount (time or energy) specified in the token.

The PTU 1102 may for example validate the signature of the token using a local certificate chain and thus does not need to have a network connection. However, if a network connection is available, the PRU 1102 may use it for validating certificate authenticity or detecting certification revocation.

If the PTU 1102 was not able to validate the PRU 1101 since the PRU has not provided a valid token, the PTU 1102 can for example reject PRU 1101 by one or a combination of
1. Not enabling the PRU 1101 to charge by means of PRU control characteristics such as setting a bit in an "Enable PRU Output" field to zero,
2—Not enabling the PRU 1101 to charge through PRU control characteristics by setting a bit in an "Enable PRU Charge Indicator" bit field to zero,
3—Not permitting the PRU 1101 to charge by setting a bit in a "Permission" field to a value that is reserved for denying permission due to authentication causes or without any reason.

The PTU 1102 may also choose to only accept the charging response token 1118 via the communication channel 113 if it has been validated that the communication channel 113 is connected to the mobile device which is going to be charged, e.g., which is placed on the wireless power transmitting device (e.g., charging mat) for charging. The PTU 1102 may do this by requesting the PRU 1101 suspend charging for a random amount of time, as described previously.

As described above, the power transmitting device may verify that a wireless power receiving device to which its power transmitter transmits power is the same as the wireless power receiving device connected to the wireless power transmitting device by a communication channel based on whether the wireless power receiving device adapts the parameter of the power reception, e.g. based on whether it interrupts power reception according to an instruction.

FIG. 12 shows a flow diagram 1200 illustrating a corresponding flow carried out by the wireless power receiving device.

In 1201, the wireless power receiving device wirelessly receives power from a wireless power transmitting device.

In 1202, the wireless power receiving device receives an instruction to adapt a parameter of the power reception from the wireless power transmitting device via a communication channel between the wireless power transmitting device and the device.

In 1203, the wireless power receiving device adapts the parameter of the power reception in response to the instruction.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A wireless power transmitting device comprising:
 a power transmitter to wirelessly transmit power to a wireless power receiving device;
 a controller configured to control the wireless power transfer to the wireless power receiving device via a wireless power transfer control channel of a first wireless communication network between the wireless power transmitting device and the wireless power receiving device; wherein the first wireless communication network comprises a short range radio access technology; and
 a signaling circuit configured to signal access information for a second wireless communication network via the wireless power transfer control channel; wherein the first wireless communication network is different from the second wireless communication network.

2. The wireless power transmitting device according to claim 1, wherein the first wireless communication network and the second wireless communication network use different radio access technologies.

3. The wireless power transmitting device according to claim 1, wherein the wireless power transmitting device comprises an authentication circuit configured to authenticate the wireless power receiving device and wherein the signaling circuit is configured to signal the access information based on whether the authentication circuit has authenticated the wireless power receiving device.

4. The wireless power transmitting device according to claim 1, wherein the wireless power transmitting device comprises an authentication circuit configured to authenticate the wireless power receiving device and wherein the power transmitter is configured to wirelessly transmit power to the wireless power receiving device based on whether the authentication circuit has authenticated the wireless power receiving device.

5. The wireless power transmitting device according to claim 4, wherein the authentication circuit is configured to authenticate the wireless power receiving device by verifying that the wireless power receiving device to which the power transmitter transmits power is the same as the wireless power receiving device connected to the wireless power transmitting device by the wireless power transfer control channel.

6. The wireless power transmitting device according to claim 1, wherein the power transmitter is configured to wirelessly transmit power to the wireless power receiving device using a power signal and the wireless power transfer control channel is a channel based on a modulation of the power signal.

7. A wireless power transmitting device comprising:
 a power transmitter configured to wirelessly transmit power to a wireless power receiving device;
 a controller configured to instruct the wireless power receiving device to adapt a parameter of the power reception from the power transmitter via a communication channel between the wireless power transmitting device and the wireless power receiving device;
 a detector configured to detect whether the wireless power receiving device adapts the parameter of the power reception;
 an authentication circuit configured to verify that the wireless power receiving device to which the power transmitter transmits power is the same as the wireless power receiving device connected to the wireless power transmitting device by the communication channel based on whether the wireless power receiving device adapts the parameter of the power reception.

8. The wireless power transmitting device according to claim 7, wherein the controller is configured to instruct the wireless power receiving device to interrupt the power reception from the power transmitter.

9. The wireless power transmitting device according to claim 7, wherein the controller is configured to instruct the wireless power receiving device to adapt the parameter of the power reception for a predetermined time wherein the authentication circuit is configured to verify that the wireless power receiving device to which the power transmitter transmits power is the same as the wireless power receiving device connected to the wireless power transmitting device by the communication channel based on whether the wireless power receiving device adapts the parameter of the power reception for the predetermined time.

10. The wireless power transmitting device according to claim 9, wherein the controller is configured to randomly determine the predetermined time.

11. The wireless power transmitting device according to claim 7, further comprising a signaling circuit configured to signal access information for a wireless communication network to the wireless power receiving device based on whether the wireless power receiving device to which the power transmitter transmits power is the same as the wireless power receiving device connected to the wireless power transmitting device by the communication channel.

12. The wireless power transmitting device according to claim 11, wherein the wireless communication network is a wireless local area network or a cellular mobile telephone communication network.

13. The wireless power transmitting device according to claim 11, wherein the access information includes credentials for the wireless communication network.

14. A wireless power transmitting device comprising:
a power transmitter configured to wirelessly transmit power to a wireless power receiving device;
a controller configured to
request the wireless power receiving device to provide an electronic token indicating that the wireless power receiving device has the right to receive power from the power transmitter;
verify, based on the reception of a valid token from the wireless power receiving device, whether the wireless power receiving device has the right to receive power from the power transmitter; and
control the power transmitter to transmit power to the wireless power receiving device based on whether the wireless power receiving device has the right to receive power from the power transmitter.

15. The wireless power transmitting device according to claim 14, wherein the controller is configured to determine whether a token received from the wireless power receiving device is valid.

16. The wireless power transmitting device according to claim 15, wherein the controller is configured to determine whether a token received from the wireless power receiving device is valid based on a signature of the electronic token.

17. The wireless power transmitting device according to claim 15, wherein the controller is configured to request the wireless power receiving device to provide an electronic token indicating that the wireless power receiving device has the right to be fully charged by the power transmitter, to verify, based on the reception of a valid token from the wireless power receiving device, whether the wireless power receiving device has the right to be fully charged by the power transmitter and to control the power transmitter to fully charge the wireless power receiving device based on whether the wireless power receiving device has the right to be fully charged by the power transmitter.

18. The wireless power transmitting device according to claim 15, wherein the controller is configured to request the wireless power receiving device to provide the electronic token by transmitting a request message to the wireless power receiving device indicating that the wireless power receiving device is to provide the electronic token.

19. The wireless power transmitting device according to claim 18, wherein the message includes at least one of the address of a communication device providing the electronic token, a serial number of the wireless power transmitting device, a URI of a web service providing the electronic token and a nonce.

* * * * *